(12) United States Patent
Nakazawa et al.

(10) Patent No.: US 6,956,575 B2
(45) Date of Patent: Oct. 18, 2005

(54) CHARACTER PROVISION SERVICE SYSTEM, INFORMATION PROCESSING APPARATUS, CONTROLLING METHOD THEREFOR, AND RECORDING MEDIUM

(75) Inventors: Hiroaki Nakazawa, Tokyo (JP); Tsuyoshi Yagisawa, Kanagawa (JP); Kazue Kaneko, Kanagawa (JP); Takashi Aso, Kanagawa (JP); Makoto Hirota, Yokohama (JP); Kazuko Suzuki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 852 days.

(21) Appl. No.: 09/915,419

(22) Filed: Jul. 27, 2001

(65) Prior Publication Data
US 2002/0046050 A1 Apr. 18, 2002

(30) Foreign Application Priority Data

Jul. 31, 2000 (JP) ........................................ 2000-231880
Jul. 13, 2001 (JP) ........................................ 2001-214290

(51) Int. Cl.[7] ............................................. G06T 15/70
(52) U.S. Cl. .......................................... 345/473; 705/14
(58) Field of Search ............................ 345/473; 705/14

(56) References Cited

U.S. PATENT DOCUMENTS

| 5,524,195 | A | * | 6/1996 | Clanton et al. ................ 725/61 |
| 6,085,256 | A | | 7/2000 | Kitano et al. ................ 709/303 |
| 6,227,974 | B1 | * | 5/2001 | Eilat et al. ..................... 463/40 |
| 6,229,533 | B1 | * | 5/2001 | Farmer et al. ............... 345/473 |
| 6,244,959 | B1 | * | 6/2001 | Miyamoto et al. ............ 463/31 |
| 6,448,970 | B1 | * | 9/2002 | Kajioka et al. ............. 345/473 |
| 6,686,918 | B1 | * | 2/2004 | Cajolet et al. .............. 345/473 |
| 2001/0018667 | A1 | * | 8/2001 | Kim ............................ 705/14 |
| 2002/0089506 | A1 | * | 7/2002 | Templeman ................ 345/473 |
| 2002/0143622 | A1 | * | 10/2002 | Taliercio et al. .............. 705/14 |
| 2002/0171647 | A1 | * | 11/2002 | Sterchi et al. .............. 345/473 |
| 2003/0156134 | A1 | * | 8/2003 | Kim ........................... 345/753 |

* cited by examiner

Primary Examiner—Almis R. Jankus
Assistant Examiner—Jon Hadidi
(74) Attorney, Agent, or Firm—Fitzpatrick, Cella, Harper & Scinto

(57) ABSTRACT

In a character provision service system for providing users with characters such as interface agents and virtual characters in virtual spaces on computers or in TV games, charges for use of a provided character is computed according to a motion made by the character. This system enables each user to easily purchase with security a character capable of moving according user's need, and also enables character data providers to collect charges according to motions made by provided characters and to provide various characters without anxiety about unauthorized use of the characters.

35 Claims, 17 Drawing Sheets

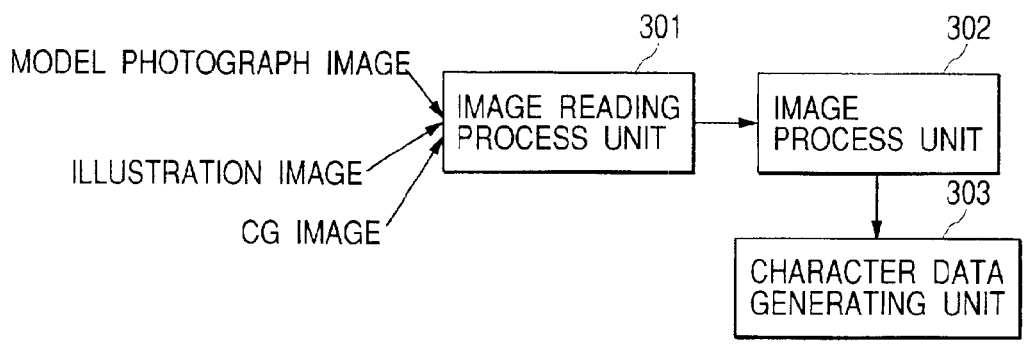
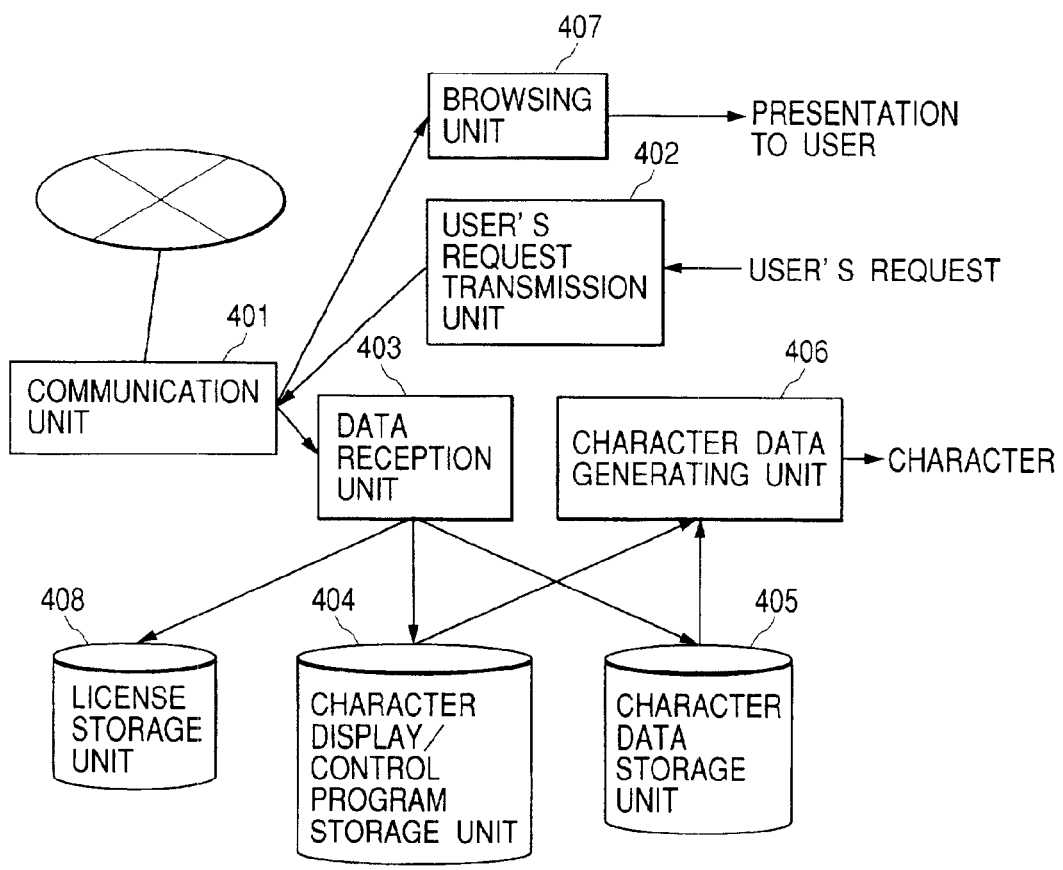

| TYPE | CONDITION | FEE | PROGRAM ROYALTY |
|---|---|---|---|
| TIME SPECIFIED | 6 HOURS | 100 YEN | 10 YEN |
| | 1 DAY | 200 YEN | 20 YEN |
| | 3 DAYS | 300 YEN | 30 YEN |
| | 1 WEEK | 500 YEN | 50 YEN |
| | 2 WEEKS | 800 YEN | 80 YEN |
| MOTION SPECIFIED | 10000 FRAMES | 100 YEN | 10 YEN |
| | 20000 FRAMES | 200 YEN | 20 YEN |
| | 50000 FRAMES | 400 YEN | 40 YEN |
| | 100000 FRAMES | 700 YEN | 70 YEN |
| | 200000 FRAMES | 1000 YEN | 100 YEN |

FIG. 8

| CHARACTER | TYPE | CONDITION | FEE | CHARACTER ROYALTY |
|---|---|---|---|---|
| A | TIME SPECIFIED | 6 HOURS | 100 YEN | 50 YEN |
| | | 1 DAY | 200 YEN | 100 YEN |
| | | 3 DAYS | 300 YEN | 150 YEN |
| | | 1 WEEK | 500 YEN | 250 YEN |
| | | 2 WEEKS | 800 YEN | 300 YEN |
| | MOTION SPECIFIED | 10000 FRAMES | 100 YEN | 50 YEN |
| | | 20000 FRAMES | 200 YEN | 100 YEN |
| | | 50000 FRAMES | 400 YEN | 200 YEN |
| | | 100000 FRAMES | 700 YEN | 300 YEN |
| | | 200000 FRAMES | 1000 YEN | 300 YEN |
| B | TIME SPECIFIED | 6 HOURS | 50 YEN | 30 YEN |
| | | 1 DAY | 100 YEN | 50 YEN |
| | | 3 DAYS | 150 YEN | 75 YEN |
| | | 1 WEEK | 250 YEN | 100 YEN |
| | | 2 WEEKS | 500 YEN | 200 YEN |
| | MOTION SPECIFIED | 10000 FRAMES | 50 YEN | 30 YEN |
| | | 20000 FRAMES | 100 YEN | 50 YEN |
| | | 50000 FRAMES | 200 YEN | 100 YEN |
| | | 100000 FRAMES | 350 YEN | 150 YEN |
| | | 200000 FRAMES | 500 YEN | 200 YEN |
| ⋮ | ⋮ | | ⋮ | |

FIG. 9

| CHARACTER | MOTION MODE | EXTRA FEE RATE | CHARACTER LOYALTY EXTRA FEE RATE |
|---|---|---|---|
| A | CHAT : TEXT | 0% | 0% |
| | CHAT : VOICE (JAPANESE) | 10% | 10% |
| | CHAT : VOICE (ENGLISH) | 15% | 15% |
| | CHAT : SIGN LANGUAGE | 20% | 20% |
| | PERSONALITY : PASSIONATE TYPE | 30% | 30% |
| | PERSONALITY : COOL TYPE | 10% | 5% |
| | PERSONALITY : LAZY TYPE | 5% | 5% |
| | ⋮ | ⋮ | ⋮ |
| B | CHAT : TEXT | 0% | 0% |
| | CHAT : VOICE (JAPANESE) | 10% | 10% |
| | CHAT : VOICE (ENGLISH) | 5% | 5% |
| | CHAT : SIGN LANGUAGE | 0% | 0% |
| | PERSONALITY : CHEERFUL TYPE | 20% | 20% |
| ⋮ | PERSONALITY : COOL TYPE | 10% | 10% |
| | ⋮ | ⋮ | ⋮ |

FIG. 10

SELECT UTILIZATION FORM OF CHARACTER DISPLAY/CONTROL PROGRAM

| TYPE | CONDITION | FEE | SELECT |
|---|---|---|---|
| TIME SPECIFIED | 6 HOURS | 100 YEN | ☐ |
| | 1 DAY | 200 YEN | ☐ |
| | 3 DAYS | 300 YEN | ☐ |
| | 1 WEEK | 500 YEN | ☐ |
| | 2 WEEKS | 800 YEN | ☐ |
| MOTION SPECIFIED | 10000 FRAMES | 100 YEN | ☐ |
| | 20000 FRAMES | 200 YEN | ☐ |
| | 50000 FRAMES | 400 YEN | ☐ |
| | 100000 FRAMES | 700 YEN | ☐ |
| | 200000 FRAMES | 1000 YEN | ☐ |

SELECT CHARACTER AND UTILIZATION FORM OF IT
IF CLICK SAMPLE BUTTON, YOU CAN CONFIRM SAMPLE IMAGE

| CHARACTER | TYPE | CONDITION | FEE | SELECT |
|---|---|---|---|---|
| A [SAMPLE] | TIME SPECIFIED | 6 HOURS | 100 YEN | ☐ |
| | | 1 DAY | 200 YEN | ☐ |
| | | 3 DAYS | 300 YEN | ☐ |
| | | 1 WEEK | 500 YEN | ☐ |
| | | 2 WEEKS | 800 YEN | ☐ |
| | MOTION SPECIFIED | 10000 FRAMES | 100 YEN | ☐ |
| | | 20000 FRAMES | 200 YEN | ☐ |
| | | 50000 FRAMES | 400 YEN | ☐ |
| | | 100000 FRAMES | 700 YEN | ☐ |
| | | 200000 FRAMES | 1000 YEN | ☐ |
| B [SAMPLE] | | ⋮ | ⋮ | ⋮ |

FIG. 11

SELECT CHARACTER AND UTILIZATION FORM OF IT
FEE IS CALCULATED

IF CLICK SAMPLE BUTTON, YOU CAN CONFIRM SAMPLE IMAGE

| CHARACTER | CHAT | PERSONALITY | CHARGE |
|---|---|---|---|
| ■ A <br> SAMPLE | ☐ TEXT <br> ■ VOICE <br> ■ JAPANESE <br> ☐ ENGLISH <br> ☐ SIGN LANGUAGE | ☐ COOL TYPE <br> ■ PASSIONATE TYPE <br> ☐ LAZY TYPE | ● TERM <br> ○ MOTION AMOUNT <br> 1 WEEK <br> 700 YEN |
| ■ B <br> SAMPLE | ☐ TEXT <br> ■ VOICE <br> ■ JAPANESE <br> ☐ ENGLISH | ■ COOL TYPE <br> ☐ CHEERFUL TYPE | ● TERM <br> ○ MOTION AMOUNT <br> 1 WEEK <br> 600 YEN |

FIG. 12

SELECT CHARACTER AND UTILIZATION FORM OF IT
FEE IS CALCULATED

IF CLICK SAMPLE BUTTON, YOU CAN CONFIRM SAMPLE IMAGE

| CHARACTER | CHAT | PERSONALITY | CHARGE |
|---|---|---|---|
| ■ A <br> SAMPLE | ☐ TEXT <br> ■ VOICE <br>   ■ JAPANESE <br>   ☐ ENGLISH <br> ☐ SIGN LANGUAGE | ☐ COOL TYPE <br> ■ PASSIONATE TYPE <br> ☐ LAZY TYPE | ● TERM <br> ○ MOTION AMOUNT <br> [1 WEEK] <br> 700 YEN |
| ■ B <br> SAMPL... | ☐ TEXT <br> ■ VOICE <br>   ■ JAPANESE | ■ COOL TYPE <br> ☐ CHEERFUL TYPE | ● TERM <br> ○ MOTION AMOUNT <br> [1 WEEK] |

SELECT FAVORITE VOICE

| CHILD (GIRL) | CHILD (BOY) | ADULT (FEMALE) | ADULT (MALE) |
|---|---|---|---|
| | | TAKAKO FUJIWARA | |

NAME: TAKAKO FUJIWARA SEX: FEMALE AGE: 18 BLOOD TYPE: A PERSONALITY: GENTLE

[ OK ]   [ CANCEL ]

FIG. 13

| USER ID | CHARACTER | CHAT | PERSONALITY | CHARGE | PASSWORD |
|---|---|---|---|---|---|
| AD20001 | A | VOICE (JAPANESE) | PASSIONATE TYPE | 1 WEEK | * * * |
| | B | VOICE (JAPANESE) | COOL TYPE | 1 WEEK | * * * |
| BC0040 | B | TEXT | CHEERFUL TYPE | 100000 FRAMES | * * * |

FIG. 14

| CHARACTER | MOTION | POINT (1 MOTION) |
|---|---|---|
| A | SMILE | 2 |
| | WEEP | 3 |
| | SURPRISED | 1 |
| | ANGRY | 2 |
| B | HESITATION | 1 |
| | EMBARRASSED | 2 |
| | YAWN | 1 |
| | SLEEP | 0 |

FIG. 19

| TYPE | CONDITION | FEE | PROGRAM ROYALTY |
|---|---|---|---|
| TIME | PER MINUTE | 10 YEN | 5 YEN |
| MOTION AMOUNT | PER 10 FRAMES | 1 YEN | 0.5 YEN |

FIG. 20

| CHARACTER | TYPE | CONDITION | FEE | CHARACTER ROYALTY |
|---|---|---|---|---|
| A | TIME | PER MINUTE | 10 YEN | 5 YEN |
| A | MOTION AMOUNT | PER 10 FRAMES | 1 YEN | 0.5 YEN |
| B | TIME | PER MINUTE | 20 YEN | 10 YEN |
| B | MOTION AMOUNT | PER 10 FRAMES | 2 YEN | 1 YEN |
| : | : |  | : |  |

CHARACTER PROVISION SERVICE SYSTEM, INFORMATION PROCESSING APPARATUS, CONTROLLING METHOD THEREFOR, AND RECORDING MEDIUM

BACKGROUND OF THE INVENTION

1. Field of the Invention

The present invention relates to a character provision service system for providing users with characters such as interface agents and virtual characters in virtual spaces on computers or in TV games. The present invention also relates to an information processing apparatus used in the character provision service system, to a method of controlling the apparatus, and to a recording medium.

2. Related Background Art

In a piece of software for an interactive process using an interface agent, a virtual character or the like (collectively referred to as "character", hereinafter) capable of having a conversation with a user, the character is designed to make predetermined motions or expressions in a 3D graphic or the like. A character data provider provides a user with characters having such motions and expressions through pieces of software comprising data on a plurality of images created by a graphic designer or the like or data on a plurality of images obtained by photographing a particular person, and through an apparatus or a system in which each piece of software is executed. Through the above-described software and the apparatus or system in which the software is executed, a user purchases a product in which a set of a plurality of characters is packed and selects some of the plurality of characters in the purchased product according to his or her need.

The above-described kind of software and the apparatus or system in which the software is executed entail problems described below.

(1) Even though users need various characters unique in face, figure and motion, they can only select those packed in provided products. Also, a selected character only performs motions and expressions specified in advance by a character designer.

(2) When a user needs only a new motion or expression with respect to a character, he or she must additionally purchase the entire of a product including the motion or expression of the character, which is inefficient in terms of cost and expense in time and effort for purchase.

(3) The cost at which a provider providing the above-described software or programs develops a plurality of characters in response to the needs of individual users and provides data on the developed characters is considerably high. Therefore, only a limited number of character data providers can provide characters matching the needs of users.

(4) A character data provider cannot receive a compensation for a motion actually performed by a character on the basis of data on created images or photographed images prepared by the provider. Also, character data providers cannot check unauthorized use of their characters and cannot provide data on the characters without anxiety about unauthorized use of the data.

SUMMARY OF THE INVENTION

In view of the above-described problems, an object of the present invention is to provide a character service system and an information processing apparatus for enabling a user to easily and positively select and purchase a character which makes a motion that the user needs and to pay a charge as an equivalent for the motion, a method of controlling the apparatus, and a recording medium.

The other objects and features of the present invention will become apparent upon reading the following description of embodiments of the invention in conjunction with the accompanying drawings.

BRIEF DESCRIPTION OF THE DRAWINGS

FIG. 3 is a block diagram showing the configuration of a character generating computer;

FIG. 4 is a block diagram showing the configuration of a user computer;

FIG. 8 is a diagram showing royalty data with respect to character data;

FIG. 9 is a diagram showing royalty data with respect to character data;

FIG. 10 is a diagram showing an example of catalog information;

FIG. 11 is a diagram showing an example of catalog information;

FIG. 12 is a diagram showing an example of catalog information;

FIG. 13 is a diagram showing an example of a license management table for management of licenses;

FIG. 14 is a diagram showing a case where points are set as character royalty data;

FIG. 19 is a diagram showing royalty data with respect to a character display/control program;

FIG. 20 is a diagram showing royalty data with respect to character data;

DESCRIPTION OF THE PREFERRED EMBODIMENTS

<First Embodiment>

A character provision service system in a first embodiment of the present invention has features described below.

The configuration and operation of the character provision service system in the first embodiment will be described in detail with reference to the drawings.

(Entire Configuration of Character Provision System)

Figure 1:
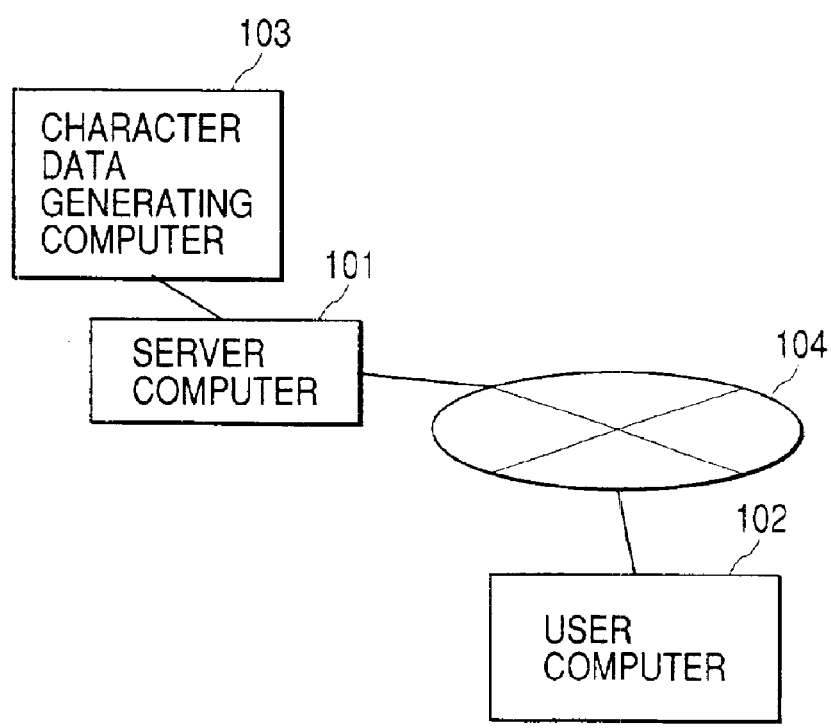
FIG. 1 is a block diagram showing the configuration of a character provision service system.

FIG. 1 shows the entire configuration of the character provision service system of this embodiment. The character provision service system includes a server computer 101, a user computer 102, a character data generating computer 103, and a network 104.

The server computer 101 distributes a character display/control program and character data necessary for generating characters. The server computer 101 issues and manages licenses for use of character display/control programs and character data and performs charge management.

The user computer 102 receives a program for displaying and controlling a character (hereinafter referred to as "character display/control program") and character data from the server computer 101 under an operating instruction from a user. The user computer 102 starts the received character display/control program, generates a character from the character data, and displays and controls the generated character. The user computer 102 is connected to the server computer 101 via the network 104 so as to be able to communicate with the server computer 101.

The character data generating computer 103 generates, under an operating instruction from a character data provider, character data from image data or data on a plurality of images obtained by photographing a particular person. The character data generating computer 103 is capable of data communication with the server computer 101.

The network 104 is, for example, the Internet over which data communication between the server computer 101 and the user computer 102 is performed.

While for ease of explanation FIG. 1 illustrates a case in which only one computer is provided as each of the server computer 101, the user computer 102 and the character data generating computer 103, a plurality of computers may exist as each kind of computer.

(Internal Configuration of Server Computer 101)

Figure 2:
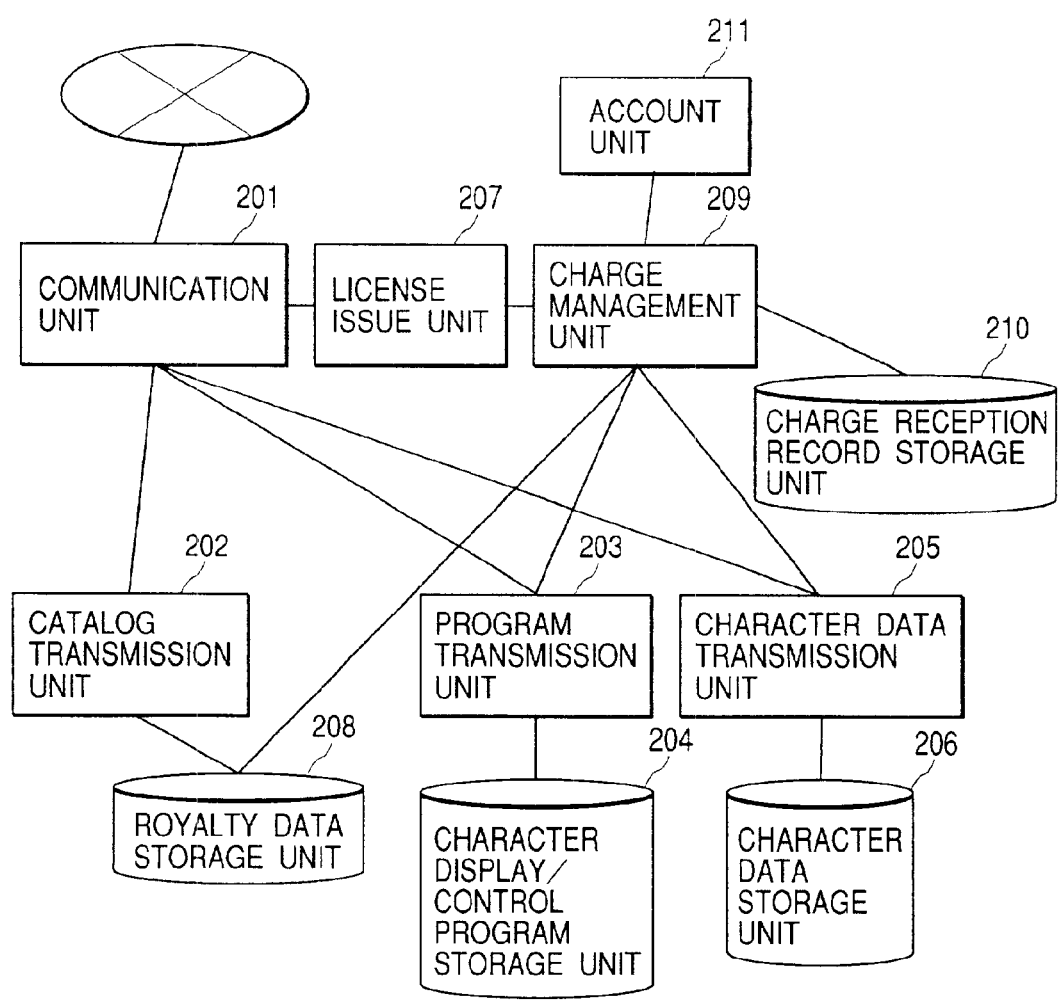
FIG. 2 is a block diagram showing the configuration of a server computer.

FIG. 2 is a block diagram showing server functions performed by the server computer 101.

The server computer 101 includes a communication unit 201, a catalog transmission unit 202, a program transmission unit 203, a character display/control program storage unit 204, a character data transmission unit 205, a character data storage unit 206, a license issue unit 207, a royalty data storage unit 208, a charge management unit 209, a charge reception record storage unit 210, and an account unit 211.

The communication unit 201 performs data communication with the user computer 102 over the network 104.

The catalog transmission unit 202 transmits to the user computer 102 catalog information for presenting character display/control programs and character data which can be provided by the server computer 101.

The program transmission unit 203 transmits a character display/control program to the user computer 102.

The character display/control program storage unit 204 stores character display/control programs. The program transmission unit 203 transmits some of the stored character display/control programs to the user computer 102.

The character data transmission unit 205 transmits character data to the user computer 102.

The character data storage unit 206 stores character data. The character data transmission unit 205 transmits some of the stored character data to the user computer 102.

The license issue unit 207 issues to the user computer 102 licenses to use character display control programs and character data as described below.

The royalty data storage unit 208 stores charge information about character display/control programs and character data with respect to motions of characters.

The charge management unit 209 manages charges to be paid by the user to program providers and character data providers with respect to licenses issued from the license issue unit 207 to the user computer 102.

The charge reception record storage unit 210 stores information about reception of charges managed by the charge management unit 209.

The account unit 211 settles an account of charges to be paid by the user to program providers and character data providers.

(Internal Configuration of Character Data Generating Computer 103)

FIG. 3 is a block diagram showing server functions performed by the character data generating computer 103.

The character data generating computer 103 includes, as shown in FIG. 3, an image reading process unit 301, an image process unit 302, and a character data generating unit 303.

The image reading process unit 301 is supplied with data on illustration images and computer graphics images created by character data providers and data on model photograph images obtained by photographing persons (e.g., character provider themselves). The image reading process unit 301 converts the supplied image data into data on three-dimensional (3D) models of characters.

The image process unit 302 performs image transform processing on the character three-dimensional (3D) model data obtained by the image reading process unit 301 such that the drawing style (deformed style, realistic comic style, or the like), size, colors (including texture and the like), etc., of each character are changed.

The character data generating unit 303 performs processing for making each character move on the basis of the character 3D model data processed by the image process unit 302, thereby generating character data.

(Internal Configuration of User Computer 102)

FIG. 4 is a block diagram showing functions performed by the user computer 102.

The user computer 102 includes, as shown in FIG. 4, a communication unit 401, a user's request transmission unit 402, a data reception unit 403, a character display/control program storage unit 404, a character data storage unit 405, a character generating unit 406, a browsing unit 407, and a license storage unit 408.

The communication unit 401 performs data communication with the server computer 101 over the network 104.

The user's request transmission unit 402 transmits a user's request to the server computer 101.

The data reception unit 403 receives data transmitted to the user computer 102 in response to the user's request transmitted by the user's request transmission unit 402.

The character display/control program storage unit 404 stores a character display/control program.

The character data storage unit 405 stores character data.

The character generating unit 406 generates a character by using the character display/control program stored in the program storage unit 404 and the character data stored in the character data storage unit 405.

The browsing unit 407 comprises a WWW browser or the like. The browsing unit 407 displays information transmitted from the server computer 102 and also displays the generated character.

(Operation of Character Data Generating Computer 103)

Figure 5:
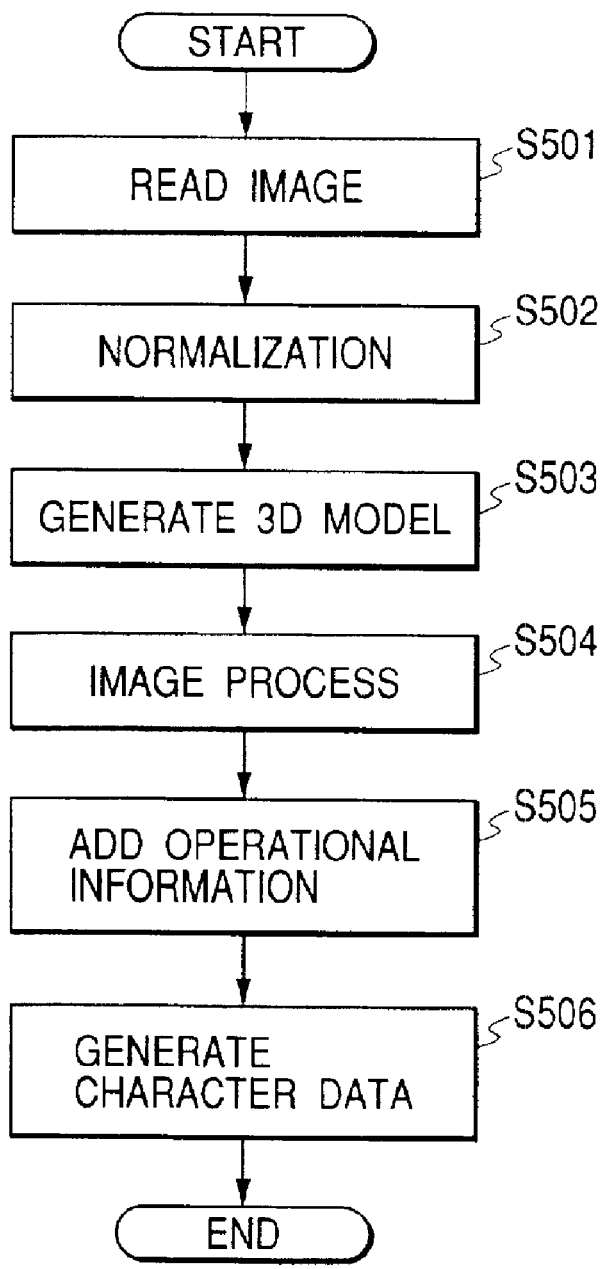
FIG. 5 is a flowchart showing the operation of the character generating computer.

FIG. 5 shows the operation of the character data generating computer 103.

In step S501, the image reading process unit 301 reads a plurality of groups of data on illustration images and computer graphics images created by character data providers and data on model photograph images obtained by photographing persons (e.g., character providers themselves).

In step S502, the image reading process unit 301 normalizes the plurality of image data groups read in step S501.

In step S503, the image reading process unit 301 converts the plurality of image data groups normalized in step S502 into data on 3D models of characters.

In step S504, the image process unit 302 performs image transform processing on the character 3D model data obtained by the image reading process unit 301 to change the drawing style (deformed style, realistic comic style, or the like), size, colors (including texture and the like), etc., of each character.

In step S505, the character data generating unit 303 performs processing for making each character move on the basis of the character 3D model data processed in step S504. For example, processing for linking names of motions and data on image frames used to make the motions to the character 3D model data is performed.

In step S506, the character data generating unit 303 forms character data by compressing the character 3D model data processed by the image process unit 302.

The character data obtained by executing steps S501 to S506 in the character data generating computer 103 as described above is transmitted to the server computer 101 to be stored in the character data storage unit 206 of the server computer 101.

To provide a plurality of different drawing styles in character data with respect to one character, the processing from step S504 may be repeatedly executed.

(Data Communication between Server Computer 101 and User Computer 102)

Figures 6, 7:
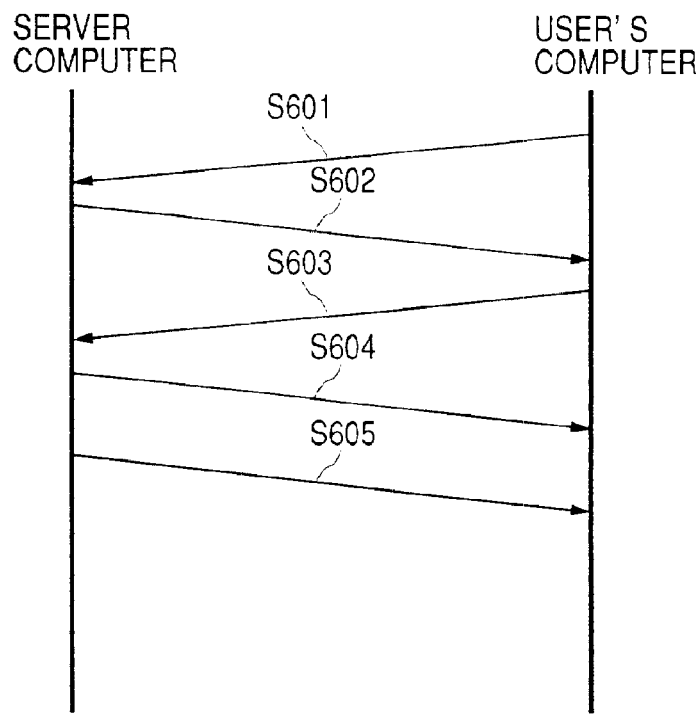
FIG. 6 is a diagram showing data communication and operation between the server computer and the user computer.
FIG. 7 is a diagram showing royalty data for a character display/control program.

FIG. 6 is a diagram for explaining data communication between the server computer 101 and the user computer 102 and main processing steps in the server computer 101 and the user computer 102 which characterize this embodiment, and which are executed to provide a character display/control program and character data for generating a character which moves so as to meet use conditions selected by the user.

In step S601, the user operates the user computer 102 to request the server computer 101 to transmit information on a catalog of character display/control programs and character data which can be provided to the user computer 102. For example, if the network 104 is the Internet, data in HyperText Markup Language (HTML) format may be used for requesting transmission of the catalog information.

In step S602, the server computer 101 receiving the catalog transmission request from the user computer 102 in step S601 transmits catalog information, including information on charges for character display/control programs and character data with respect to use conditions (e.g., character use time periods and amounts of motions) stored in the royalty data storage unit 208, to the user computer 102 through the catalog transmission unit 202. In step S602, the user computer 102 displays the catalog information received from the server computer 101 to enable the user to select use conditions according to his or her need.

FIG. 7 shows an example of information on charges for use of a character display/control program according to motions of a character, which information is stored in the royalty data storage unit 208. Referring to FIG. 7, charges for use of a character display/control program are set with respect to time periods during which the character moves to make character motions or amounts of motions made by the character. In FIG. 7, a "fee" is an amount to be actually paid by the user, and a "program royalty" is an amount taken from the amount paid by the user to be paid to the program provider. The remainder which is the result of subtraction of the "program royalty" from the "fee" is paid as a brokerage fee to the distribution service provider. The amount to be paid to the program provider may be designated as a rate instead of the absolute value. In such a case, a given percent (e.g., 10%) of the fee may be stored as "program royalty" in the royalty data storage unit 208. A unit amount of motions is set as the number of moving image frames displayed which corresponds to a given number of times moving image data is changed.

FIG. 8 shows an example of information on character data charges according to motions of a character, which is stored in the royalty data storage unit 208. Referring to FIG. 8, charges for use of character data are set with respect to time periods during which the character moves to make character motions or amounts of motions made by the character. In FIG. 8, a "fee" is an amount to be actually paid by the user, and a "character royalty" is an amount taken from the amount paid by the user to be paid to the character data provider. The remainder which is the result of subtraction of the "character royalty" from the "fee" is paid as a brokerage fee to the distribution service provider. The amount to be paid to the character provider may be designated as a rate instead of the absolute value. In such a case, a given percent (e.g., 10%) of the fee may be stored as "character royalty" in the royalty data storage unit 208.

In a case where the user selects different use periods or amounts of motions with respect to a character display/control program and character data, the generated character moves in the shorter use period or until the smaller amount of motions is reached. For example, in a case where the user selects 50,000 frames with respect to a character display/control program while selecting 10,000 frames with respect to character data, the character makes motions through 10,000 frames. In such a case, a message "The character will make motions through 10,000 frames. Is it OK?" may be transmitted to the user to urge the user to change the selected setting of the amount of motions in the character display/control program or the character data. Also, the excess amount of motions may be used in combination with character data or a character display/control program newly selected. That is, for example, in a case where 50,000 frames and 10,000 frames have been selected with respect to the character display/control program and character data, respectively, and the character has made motions through 10,000 frames, only character data for 40,000 frames may be newly selected next time and the character display/control program may move the character by using 40,000 frames corresponding to the remainder in the preceding use.

FIG. 9 shows an example of information on charges according to character motion modes stored in the royalty data storage unit 208. Referring to FIG. 9, charge and character royalty extra fee rates are set with respect to motion modes, respectively. The motion modes include "conversation modes" in which a character has an interactive conversation with the user. The conversation modes include, for example, a text mode in which a balloon is displayed together with the character and the character has a conversation with the user by means of letters, a voice mode in which the character has a conversation with the user by means of voice reproduced simultaneously with display of the character, and a sign language mode in which the character is made to make signs in a sign language for conversation with the user. The user can select one of the conversation modes according to his or her preference.

While the character does not move the mouth in the text mode, it moves the mouth in the voice mode. Also, the character moves the mouth and hands in the sign language mode. That is, the number of parts moved changes with respect to the modes. Therefore, different extra fee rates are separately set by being related to the conversation modes. It is also possible to select one of "personality modes" as a motion mode. The number of moving parts and the amount of motions of a character are changed, for example, between a personality mode in which the character has a tendency toward gesticulation and expression of emotions and another personality mode in which the character is gentle and smiling. Therefore, different extra fee rates are set separately by being related to the personality modes.

FIGS. 10 and 11 show an example of catalog information transmitted from the server computer 101 to the user computer 102 and displayed by the browsing unit 407 in the user computer 102. To the catalog information, sampled images, for example, may be attached as character data to improve the facility with which the user makes a selection from character data. If the network 104 is the Internet, the catalog information is transmitted in a format in accordance with the HTML or the like and the browsing unit 4 in the user computer 102 displays the catalog information shown in FIG. 10. The user selects, though a character use condition selection window shown in FIG. 11, desired use conditions (character conversation and personality modes, an amount of motions, etc.) on the basis of the displayed catalog information.

In step S603, the user requests, through the user computer 102, the server computer 101 to transmit a character display/control program and character data on the basis of the use conditions selected in step S602. At this time, the user computer 102 also transmits information necessary for settlement to the server computer 101. The information necessary for settlement comprises the number of user's bank account or the number of user's credit card, the period for which the credit card is valid, etc. The information may be transmitted after being encrypted by using an available encryption technique for the purpose of improving the security.

The charge management unit 209 operating under the control of the server computer 101 computes charges for the character display/control program and character data on the basis of use conditions selected by the user and received from the user computer 102 in step S603, and stores the results of computation in the charge reception record storage unit 210. The account unit 211 performs electronic settlement on the basis of the information stored in the charge reception record storage unit 210 and the information necessary for settlement received from the user computer 102 in step S603. At this time, the server computer 101 receives a fee from the user through the user computer 102 on the basis of the charges with respect to the use conditions stored in the royalty data storage unit 208, and pays a predetermined amount of money in the received fee to the program provider or the character data provider as a royalty.

In step S604, after the completion of the above-described settlement processing, the server computer 101 extracts the character display/control program or character data being a request of the user from the character display/control program storage unit 204 or the character data storage unit 206, and transmits the extracted program or data to the user computer 102 through the program transmission unit 203 or the character data transmission unit 205. The user computer 102 stores, in the character display/control program storage unit 404 or the character data storage unit 405, the character display/control program or character data transmitted from the server computer 101 in step S604.

In step S605, the server computer 101 issues from the license issue unit 207 a license according to the use conditions selected by the user, and transmits the issued license to the user computer 102. This license may be encrypted and attached to a piece of electric mail or the like to be transmitted to the user computer 102.

The transmitted license is registered and managed in a license table such as shown in FIG. 13, which is stored in the license storage unit 408. The character display/control program and character data transmitted from the server computer 101 to the user computer 102 in step S604 are in an encrypted state or access to them is restricted. A decryption key and a password or the like included in the license transmitted in step S605 are set to enable use of the program and data. The use conditions are related to the kind of license, and the character display/control program and the character data are used to make motions of the character according to the set license.

If the user of the user computer 102 needs a plurality of characters, other character data and a related license may be obtained by the above-described procedure.

(Operation of User Computer 102)

As described above, in the process shown in FIG. 6, the user computer 102 receives from the server computer 101 a character display/control program, character data and licenses to use the program and the data. The user computer 102 can generate a character and make motions of the character by using the character display/control program and the character data under the use conditions (a use period, an amount of motions, a motion mode, etc.) indicated in the received licenses.

Figure 15:
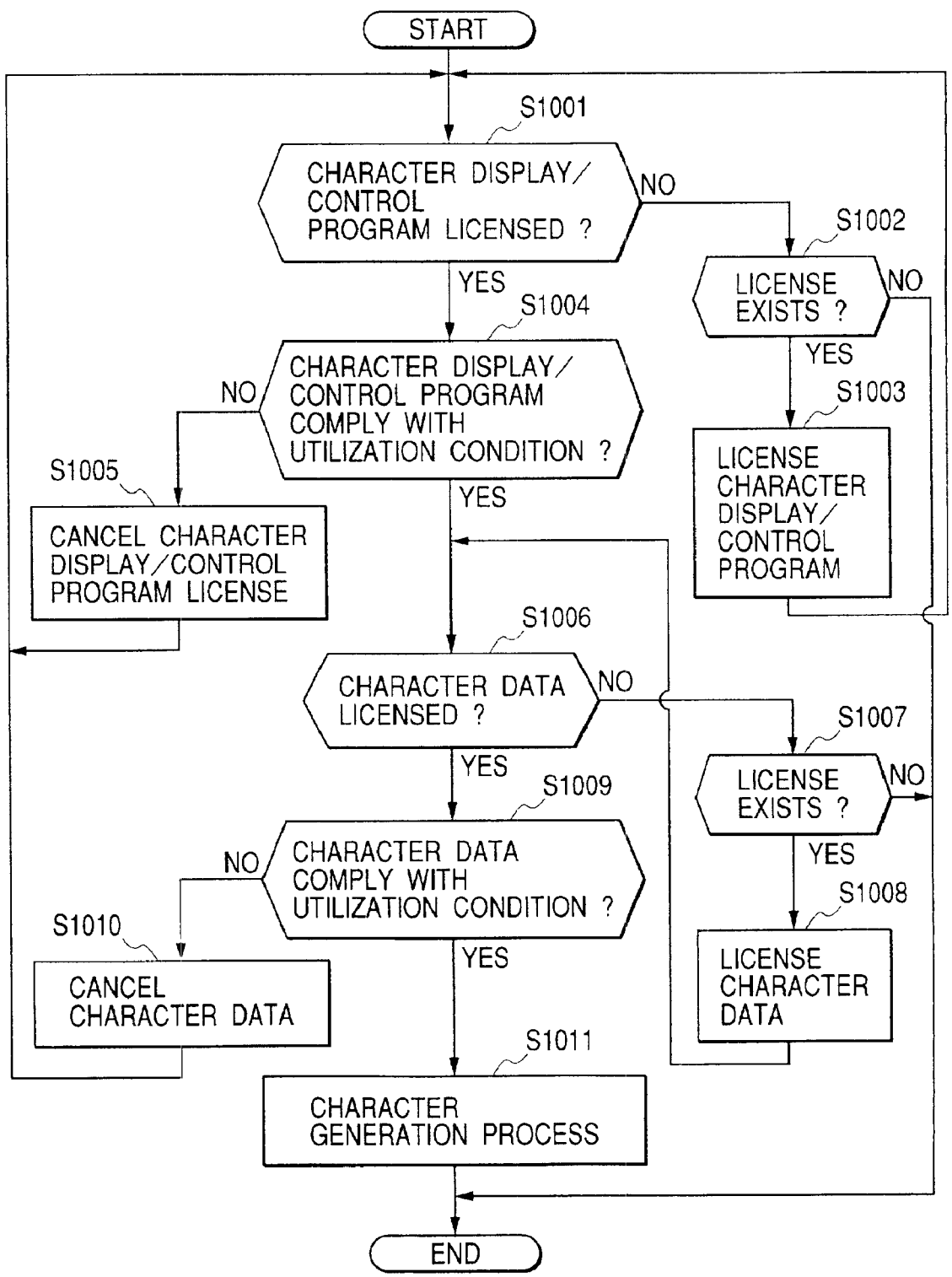
FIG. 15 is a flowchart showing the operation of the user computer.

FIG. 15 shows a procedure by which the character generating unit 406 of the user computer 102 generates a character which moves on the basis of use conditions indicated in licenses. The "licenses" used herein are issued from the server computer 101 to the user computer 102 with respect to a character display/control program and character data when the user of the user computer 102 purchases the character display/control program and character data from a program provider.

In step S1002, after the character display/control program has been started, the character generating unit 406 checks whether a decryption key and a password or the like included in the license transmitted from the server computer 101 to the user computer 102 are set in the character display/control program also transmitted from the server computer 101 to the user computer 102, because the character display/control program is in an encrypted state or access to it is restricted, and because the decryption key and the password or the like are required to enable use of the character display/control program.

If it is determined in step S1001 that the character display/control program is not licensed, the character generating unit 406 checks in step S1002 whether the license is stored in the license storage unit 408.

If it is determined in step S1002 that the license is not stored, the character generating unit 406 terminates the process for generating a character.

If it is determined in step S1002 that the license is stored, the character generating unit 406 sets the license in the character display/control program in step S1003.

The process then returns to step S1001 and the execution of the subsequent steps is repeated.

If it is determined in step S1001 that the character display/control program is licensed, the character generating unit 406 checks in step S1004 whether the license is valid with respect to the use conditions. For example, if the license indicates that the time period for use of the character is one week, the character generating unit 406 checks whether the present day is within one week from the character use start date.

If it is determined in step S1004 that the license is invalid with respect to the use conditions, the character generating unit 406 performs in step S1005 processing for canceling the character display/control program license stored in the license storage unit 408.

If it is determined in step S1004 that the license is valid with respect to the use conditions, the character generating unit 406 checks in step S1006 whether a decryption key and a password or the like included in the license transmitted from the server computer 101 to the user computer 102 are set in the character data also transmitted from the server computer 101 to the user computer 102, because the character data is in an encrypted state or access to it is restricted, and because the decryption key and the password or the like are required to enable use of the character data.

If it is determined in step S1006 that the character data is not licensed, the character generating unit 406 checks in step S1007 whether the license is stored in the license storage unit 408.

If it is determined in step S1007 that the license is not stored, the character generating unit 406 terminates the process for generating a character.

If it is determined in step S1007 that the license is stored, the character generating unit 406 sets the license in the character data in step S1008. The process then returns to step S1006 and the execution of the subsequent steps is repeated.

If it is determined in step S1006 that the character display/control program has been licensed, the character generating unit 406 checks in step S1009 whether the license is valid with respect to the use conditions. For example, if the license indicates that the time period for use of the character is one week, the character generating unit 406 checks whether the present day is within one week from the character use start date.

If it is determined in step S1009 that the license is invalid with respect to the use conditions, the character generating unit 406 performs in step S1010 processing for canceling the character data license stored in the license storage unit 408.

If it is determined in step S1009 that the license is valid with respect to the use conditions, the character generating unit 406 starts in step S1011 processing for generating a character by using the character display/control program and the character data and making the character move under the character use conditions.

In a case where one of the use conditions (the use period, the amount of motions, etc.) indicated in the licenses for the character display/control program and the character data is exceeded or it is determined that one of the licenses is invalid (step S1004, step S1009) and the license is canceled (step S1005, step S1010), the user computer 102 requests the server computer 101 to transmit a license (step S601 shown in FIG. 6), receives the license for use of the necessary character display/control program or character data from the server computer 101 (step S605 shown in FIG. 6), and again performs the process from step S1001 to enable processing for generating the desired character by using the character display/control program and character data.

In this embodiment, as described above, a user who wishes to use a character (an interface agent, a virtual character or the like) in a virtual space on a computer or in a TV game or the like for an interactive conversation with the user, for example, can select a detailed setting of kinds and amounts of motions made by the character, a time period for use of the character, etc., to enable the character provision service system to provide the character according to the user's need. Therefore, use of the character provision service system by users can be promoted.

In this embodiment, charges for use of a program for displaying and controlling a character and character data are computed and settled according to the amount of motions of the character, the time period for use of the character, motion modes, etc. Thus, a user can use a character according to his or her need by being charged according to the necessary period, amount of motions and motion modes, so that use of the character provision service system by users can be promoted. Also, a program provider or a character data provider can collect fees according to the time periods during which a character obtained from image data or photograph image data provided by the provider, the amounts of motions made by the character, and motion modes, so that provision of programs or characters by program providers or character data providers can be promoted.

In this embodiment, intervention steps are provided between users and character data providers or program providers to enable smoother payment from the users to the character data providers or program providers. For management of the intervention steps, a brokerage fee is charged. Therefore business using the character provision service system can be promoted.

<Second Embodiment>

A second embodiment of the present invention will be described with respect to a character provision service system in which a user can use a character display/control program and character data on a server computer 101 by accessing the program and data through a user computer 102 when necessary instead of reading the character display/control program and character data to the user computer 102 by performing the process described above according to the first embodiment. The character provision service system according to this embodiment will be described with respect to a case where the server computer 101 and the user computer 102 are connected to a network 104 at all times. However, the arrangement may alternatively be performed in which a user connects the user computer 102 to the server computer 101 when necessary.

Figure 16:
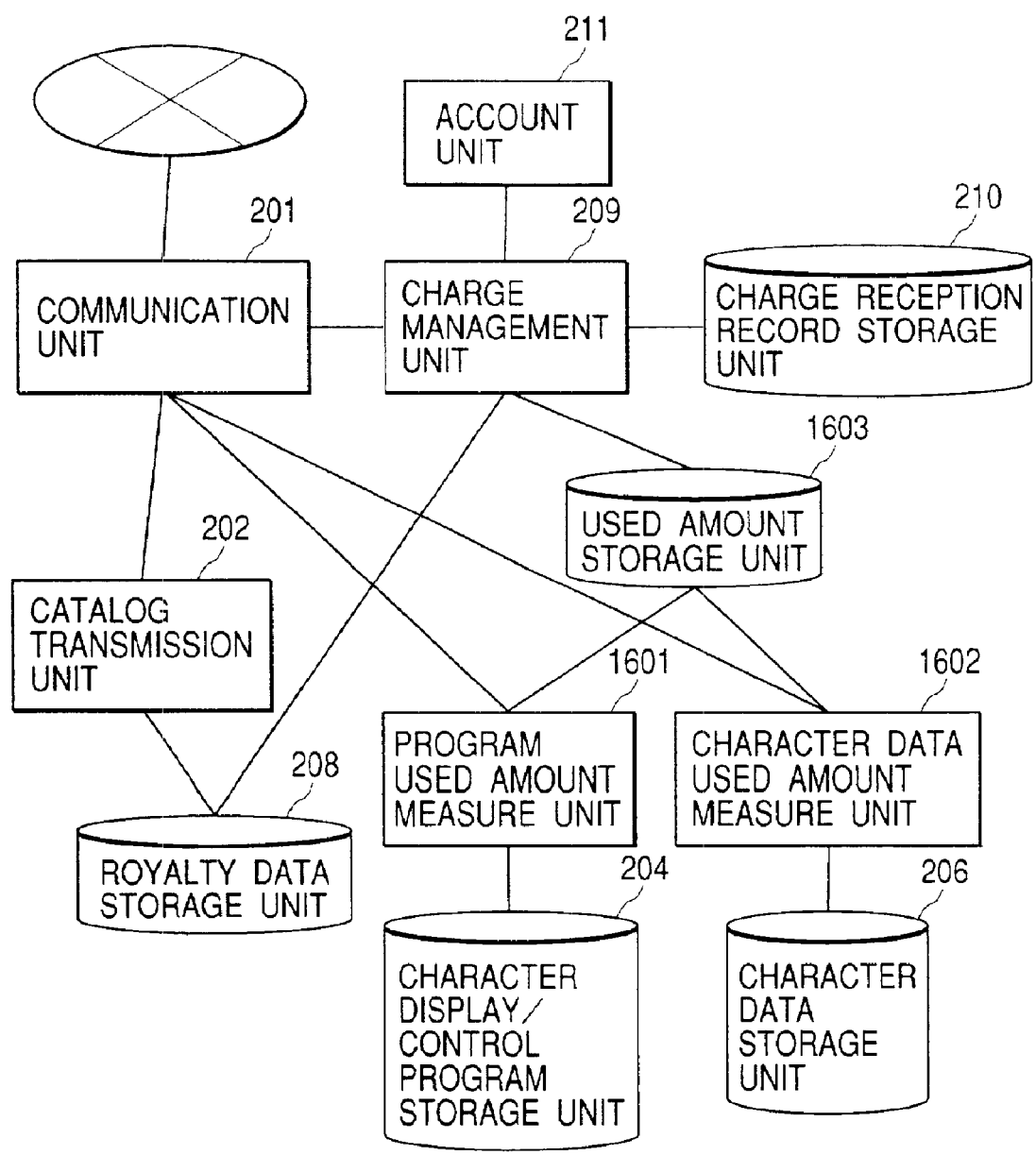
FIG. 16 is a block diagram showing the configuration of a server computer.

The configuration of the server computer 101 in this embodiment is as shown in FIG. 16, for example.

As shown in FIG. 16, the server computer 101 in this embodiment has a program used amount measure unit 1601, a character data used amount measure unit 1602, and a used amount storage unit 1603, described below, in addition to the components of the server computer 101 in the first embodiment shown in FIG. 2. The program transmission unit 203, the character data transmission unit 205, and the license issue unit 207 constituting the server computer 101 of the first embodiment shown in FIG. 2 are not necessary.

Figure 17:
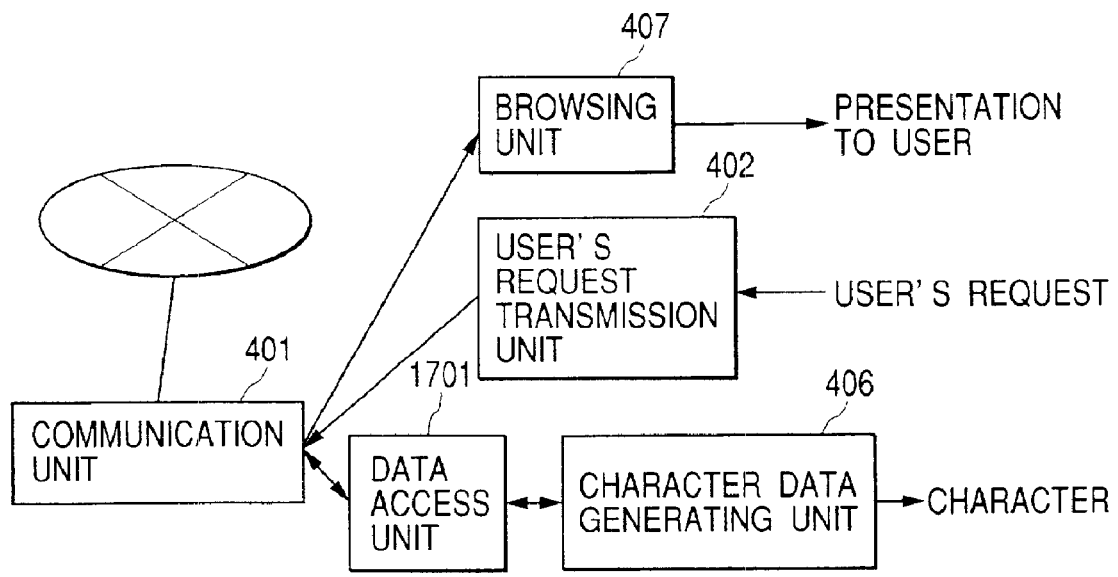
FIG. 17 is a block diagram showing the configuration of a user computer.

Referring to FIG. 17, the user computer 102 in this embodiment has a data access unit 1701 in addition to the components of the user computer 102 in the first embodiment shown in FIG. 4. The data access unit 1701 enables direct access from the user computer 102 to a character display/control program and character data on the server computer 101. The character display/control program storage unit 404, the character data storage unit 405, and the data reception unit constituting the user computer 102 of the first embodiment shown in FIG. 4 are not necessary.

Figure 18:
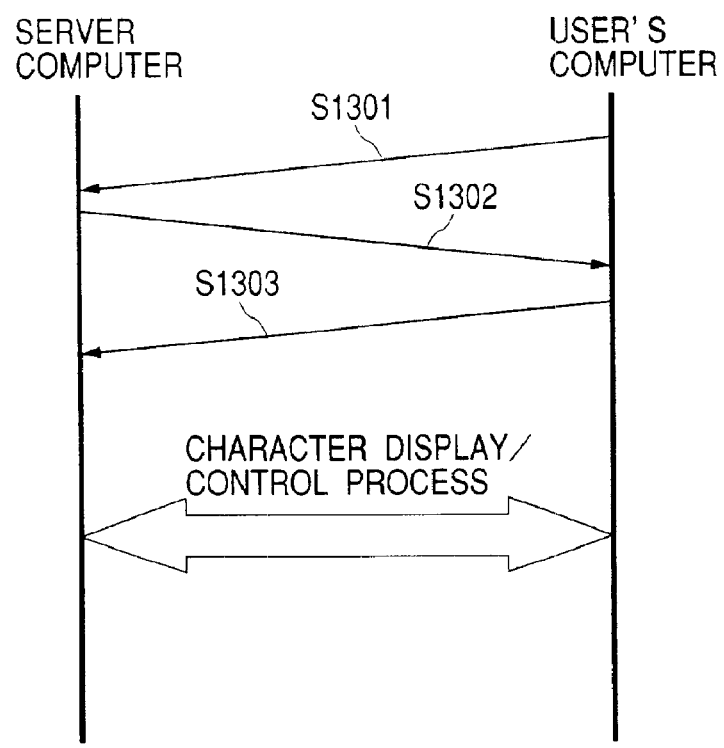
FIG. 18 is a diagram showing data communication and operation between the server computer and the user computer.

FIG. 18 is a diagram showing main processing steps in data communication between the server computer 101 and the user computer 102 in this embodiment.

In step S1301, the user operates the user computer 102 to request the server computer 101 to transmit information on a catalog of character display/control programs and character data which can be provided to the user computer 102 by a character distribution service. For example, if the network 104 is the Internet, data in HTML format may be used for requesting transmission of the catalog information.

In step S1302, the server computer 101 receiving the catalog transmission request from the user computer 102 in step S1301 transmits to the user computer 102 catalog information, including information on charges for character display/control programs and character data with respect to use conditions (e.g., use as limiting the time period during which motions are made, use as limiting the amount of motions) stored in the royalty data storage unit 208.

FIG. 19 shows an example of information (royalty data) on charges for use of a character display/control program according to motions of a character, which information is stored in the royalty data storage unit 208. Also, FIG. 20 shows an example of information (royalty data) on charges for use of character data according to motions of a character, which information is stored in the royalty data storage unit 208. Since in this embodiment the server computer 101 can measure motions of a character, charges for use of the character display/control program and character data are set per minimum unit amount of a character in the information shown in FIGS. 19 and 20. For example, 10 Yen per minute is set as a fee per unit motion period, and 1 Yen per 10 frames is set as a fee per unit motion amount.

In step S1302, the user computer 102 displays the catalog information (see FIGS. 19 and 20) received from the server computer 101 to enable the user to select use conditions according to his or her need.

In step S1303, the user requests, through the user computer 102, the server computer 101 to transmit a character display/control program and character data on the basis of the use conditions selected in step S1302. At this time, the user computer 102 also transmits information necessary for settlement to the server computer 101. The information necessary for settlement comprises information about user's secret. Therefore the information may be transmitted after being encrypted by using an available encryption technique to enable the information about user's secret to be transmitted with security.

After the completion of the above-described process, the user computer 102 obtains through the data access unit 1701 the character display/control program and the character data respectively stored in the character display/control program storage unit 204 and the character data storage unit 206 of the server computer 101, and makes the character generating unit 406 generate a character.

When the character is generated, each of the character display/control program used amount measure unit 1601 and the character data used amount measure unit 1602 of the server computer 101 measures motions of the character used in the user computer 102. Data on motions of characters used by a plurality of users and measured as described above is stored in the used amount storage unit 1603 with respect to each user.

The charge management unit 209 computes a fee to be paid by each user by using the motion information stored in the used amount storage unit 1603 and the charge information stored in the royalty data storage unit 208, and stores the computation results in the charge reception record storage unit 210. The account unit 211 performs electronic settlement on the basis of the information stored in the charge reception record storage unit 210 and the information necessary for settlement received from the user computer 102 in step S1303. At this time, the server computer 101 pays a predetermined amount of money in the fee received from each user to the program provider or the character data provider as a royalty.

In this embodiment, as described above, when the user computer 102 obtains a character from a character display/control program and character data, the server computer 101 measures motions of the character and computes charges for use of the character display/control program and character data on the basis of the measurement result. Thus, after users have generated characters, charges for use of character display/control programs and character data are computed and collected according to the motions of the characters actually used by the users. Therefore the users can readily use the character provision service system. Also, the program providers and the character data providers can obtain charges for actual use of the programs and character data through the server computer 101.

Since the character display/control programs and character data are held in the server computer 101, the program providers and the character data providers are free from anxiety about unauthorized use of them.

As a result, provision of character data and programs can be promoted.

<Third Embodiment>

A third embodiment of the present invention will be described with respect to a character formed by using a character display/control program and character data.

Figure 21:
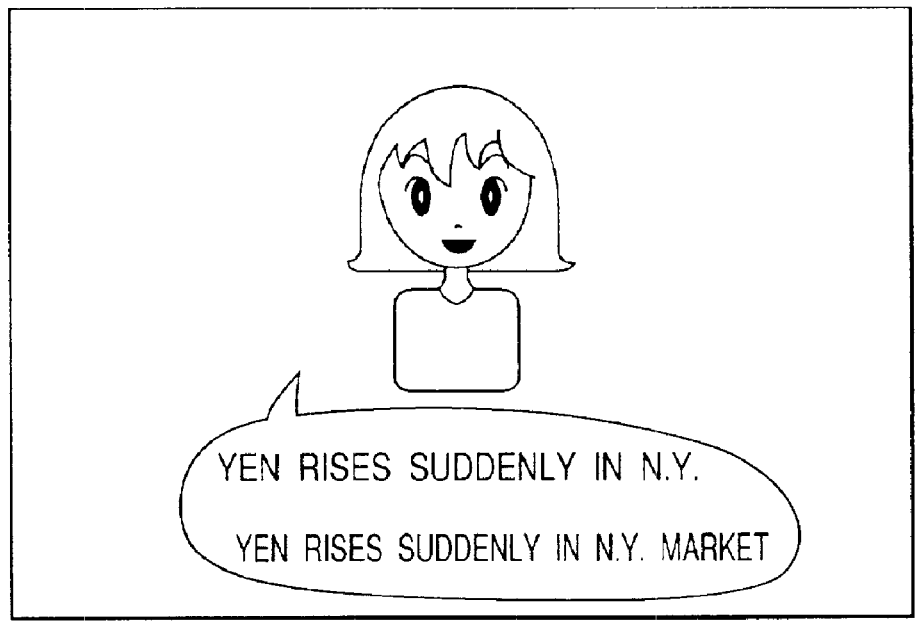
FIG. 21 is a diagram showing an example of a case where news distributed through a network is announced by using an interface agent.

FIG. 21 shows an example of a character who announces news distributed through a network. If a user selects the "text mode" among the "conversation" items in the motion modes in the catalog information shown in FIG. 11, he or she is informed of news through display of the character with letters in a balloon.

To form the corresponding character in a case where the "voice mode" is selected among the "conversation" items in the motion modes in the catalog information shown in FIG. 11, character data including data on images of a figure with basic mouth shapes corresponding to the vowels of the language in which news sentences are read and images of the figures corresponding to the opening/closing of the mouth for pronouncing consonants is required to shape the mouth of the character in synchronization with articulation in reading the sentences (referred to as "lip synchronization", hereinafter). A character display/control program for performing scheduling such as to change the character data in synchronization with the lengths of sounds based on voice data formed by a voice synthesis system, and phoneme data for producing synthesized sounds by the voice synthesis system are also required for the character.

In the above-described first embodiment, the character data, the character display/control program, the phoneme data and the voice synthesis system prepared in accordance with the third embodiment are read to the user computer 102 to form the character.

In the above-described second embodiment, the phoneme data and the voice synthesis system and the character display/control program are held on the server computer 101, and synthesized sounds and the character generated being a request from a user are edited into a sequence of video data to be sent to the user computer 102. The arrangement may alternatively be performed, in which while the voice synthesis system and the character display/control program are read to the user computer 102, the phoneme data and the character data are used by accessing the server computer 101 from the user computer 102.

In a case where the character provision service system is used in combination with a voice synthesis system, voice or sound providers which provides data for producing synthesized sounds may be included as selectable providers and a charge may be computed according to a combination of a selected sound provider, a character, etc. FIG. 12 shows an example of a window when a user selects such a combination. If "voice" is selected among "conversation" items, and if a character having a lip synchronization function is selected, a list of synthesized sound providers selectable with respect to the language to be used is displayed. Through this window, the user can make a selection while hearing sample synthesized sounds.

A user may be informed of news through display of text information and/or sign language motions made by a character as well as through voice. In such a case, the number of moved parts of the character and the amount of change in the motions vary with respect to different combinations of the information media, and charges are computed according to the contents of the combinations.

<Other Embodiments>

In the above-described first and second embodiments, charges for use of a character display/control program and character data are set according to motions made by a character generated by using the character display/control program and the character data. However, the arrangement may alternatively be performed, in which, for example, charges are set according to character motions based on character data only, while a character display/control program is sold at a fixed price.

In the above-described first and second embodiments, character display/control programs and character data are distributed to user computers 102 through network 104 typified by the Internet. Alternatively, character display/control programs and character data may be recorded on a recording medium such as CD-ROM to be distributed to users and installed on user computer 102. In such a case, only licenses may be distributed through network 104.

In the above-described first and second embodiments, motions of a character are measured based on the amount of movement of the character, the number of moved parts, the amount of change in motion, and the motion period. If an interactive conversation with the character is made, motions of the character may also be measured based on the number of bytes of a sequence of input letters or the number of input letters.

In the above-described first and second embodiments, charges are computed on the basis of motions of a character. Therefore the arrangement may be such that points are set in advance on the basis of kinds of motions such as "weep", "smile", etc., as shown in FIG. 14, and charges are computed according to the sums of points accumulated with respect to motions actually made. For example, if the expression of emotion is stronger, the amount of change in motion is larger and a higher point is set correspondingly. That is, if a character tends to openly express emotions, a higher point is set or the sum of points is increased, resulting in a higher charge. A user may purchase such points in advance from a character data provider or an agent in a prepayment system.

In the above-described first and second embodiments, data such as shown in FIGS. 7, 8, 9, 19, and 20 is used as data stored in royalty data storage unit 208. However, data in any other format may be used if it is equivalent in logical meaning to that described above.

In the above-described first and second embodiments, data communication is performed by using network 104 such as the Internet. However, any other communication means capable of data communication may alternatively be used. For example, a private line may be used.

In the above-described first and second embodiments, a computer, a central processing unit (CPU), or a microprocessor unit (MPU) is used to execute a software program for realizing the functions in the first and second embodiments. Needless to say, the all or some of the functions may be realized by logical circuits.

Figure 22:
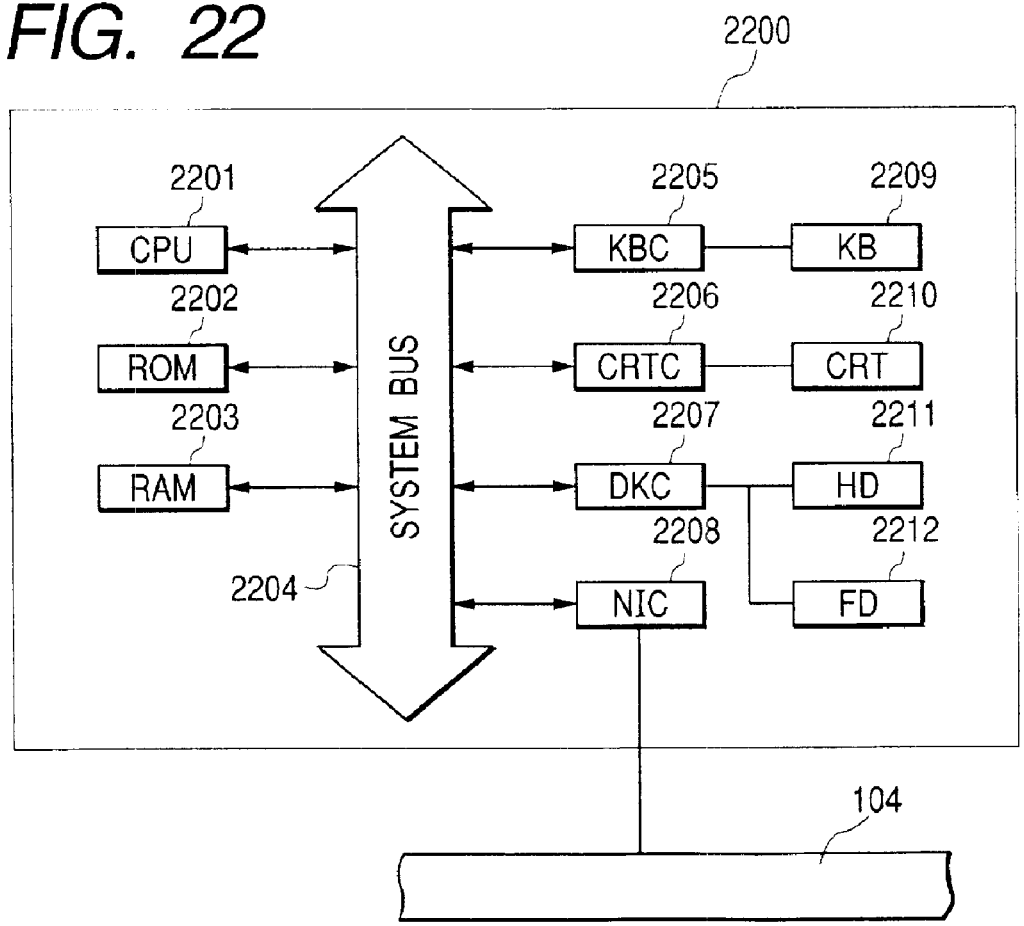
FIG. 22 is a diagram showing an example of the computer functions of the server computer and the user computer.

In the above-described first and second embodiments, each of the server computer 101 and the user computer 102 may be a computer 2200 shown in FIG. 22 capable of executing a software program for realizing the above-described functions.

The computer 2200 comprises, as shown in FIG. 22, a CPU 2201, a read-only memory (ROM) 2202, a random-access memory (RAM) 2203, a keyboard controller (KBC) 2205 for controlling a keyboard (KB) 2209, a cathode ray tube (CRT) controller 2206 for controlling a CRT display 2210, a disk controller (DKC) 607 for controlling a hard disk (HD) 2211 and a floppy disk (FD) 2212, a network interface card (NIC) 2208, and a system bus 2204 connecting the above-described components so that communication can be performed therebetween.

The system bus 2204 is connected to the network 104 shown in FIG. 1.

The CPU 2201 performs overall control of the components connected to the system bus 2204 by executing a software program stored in the ROM 2202 or HD 2211 or a software program supplied from the FD 2212.

That is, the CPU 2201 executes the program in accordance with the processing sequence described above with respect to the first or second embodiment after reading out the program from the ROM 2202, the HD 2211 or the FD 2212 to perform a control process for realizing the operation in the first or second embodiment.

The RAM 2203 functions as a main memory or a work area etc. for the CPU 2201.

The KBC 2205 controls instruction inputs from the KB 2209 and a pointing device (not shown) or the like.

The CRTC 2206 controls display on the CRT 2210.

The DKC 2207 controls access to the HD 2211 and the FD 2212 on which are stored a boot program, various application programs, edited files, user files, a network management program, the above-mentioned programs for processing in the first and second embodiments of the present invention, etc.

The NIC 2208 performs bi-directional data exchange with server computer 101 or user computer 102 on the network 104.

The present invention can be applied to a system constituted by a plurality of devices and to a system formed by one device.

Needless to say, the present invention can be achieved in such a manner that a system or an apparatus is provided with a storage medium on which a program code of software for realizing host and terminal functions in the first or second embodiment is stored, and a computer (CPU or MPU) in the system or apparatus reads out and executes the program code stored on the storage medium. In this case, the program code itself read out from the storage medium realizes the functions of each of the above-described embodiments and the storage medium storing the program code constitutes the present invention. The storage medium used to store the above-described program code is, for example, a ROM, a floppy disk, a hard disk, an optical disc, a magneto-optical disc, a CD-ROM, a CD-R, a magnetic tape, or a nonvolatile memory card.

Needless to say, the present invention comprises not only reading out and executing the program code by a computer to realize the functions of the first or second embodiment but also performing part or the entire of actual processing by an operating system or the like running on a computer and realizing the functions of the first or second embodiment by the process performed by the operating system. Needless to say, the present invention comprises a process in which the above-described program code read out from the storage medium is written to a memory provided in a function expansion board inserted into a computer or a function expansion unit connected to the computer, and a CPU or the like provided on the function expansion board or the function expansion unit performs part or the entire of actual processing on the basis of instructions based on the program code, whereby the functions of the first or second embodiment are realized.

According to the present invention, as described above, a user can use various characters by freely selecting motions of the characters. For example, when the user uses characters in a role-playing game, he or she can enjoy the game through characters skilled in acting by selecting such characters from various characters capable of expressing emotions in various ways and performing various kinds of physical actions.

Also, the user can use characters according his or her need by paying a fee according to motions made by the characters only for a necessary period of time and only by a necessary amount of movement. Character data providers can collect charges according to motions made by characters used by users.

Thus, the present invention has the advantage of promoting use of the character provision service system.

What is claimed is:

1. A character provision service system for providing characters to a user-side apparatus, said system comprising:
   generation means for generating a character capable of making a designated motion; and
   computation means for computing a charge for the character on the basis of the motion of the character,
   wherein said computation means performs the computation on the basis of the number of parts moved in the motion.

2. A character provision service system for providing characters to a user-side apparatus, said system comprising:
   generation means for generating a character capable of making a designated motion; and
   computation means for computing a charge for the character on the basis of the motion of the character,
   wherein said computation means performs the computation on the basis of the amount of movement of the motion, and the amount of movement is the number of frames in which a moving image of the character is displayed.

3. A system according to claim 1, wherein said computation means performs the computation on the basis of the period of time during which the motion is continued.

4. A system according to claim 1, wherein said computation means performs the computation on the basis of the amount of change in the motion.

5. A system according to claim 1, wherein said computation means performs the computation on the basis of a motion mode of the motion.

6. A system according to claim 5, wherein the motion mode relates to a kind of expression of the character.

7. A system according to claim 5, wherein the motion mode relates to a kind of method for a conversation held by the character.

8. A system according to claim 5, wherein the motion mode relates to a kind of personality of the character.

9. A character provision service system for providing characters to a user-side apparatus, said system comprising:
   generation means for generating a character capable of making a designated motion;
   computation means for computing a charge for the character on the basis of the motion of the character;
   measuring means for measuring the motion of the character,
   wherein said computation means performs the computation on the basis of the measured motion of the character.

10. A system according to claim 1, wherein the character is encrypted and the user-side apparatus has information for decrypting the character.

11. A system according to claim 1, wherein access to the character is restricted and the user-side apparatus has authentication information for enabling access to the character.

12. A system according to claim 1, wherein the character is generated and moved by processing character data formed from a plurality of images by executing a character display/control program.

13. An information processing apparatus for providing a character to a user-side apparatus, said information processing apparatus comprising:
   receiving means for receiving information designating a motion of the character; and
   computation means for computing a charge for the character on the basis of the motion of the character,
   wherein said computation means performs the computation on the basis of the number of parts moved in the motion.

14. An information processing apparatus for providing a character to a user-side apparatus, said information processing apparatus comprising:
   receiving means for receiving information designating a motion of the character; and
   computation means for computing a charge for the character on the basis of the motion of the character,
   wherein said computation means performs the computation on the basis of the amount of movement of the motion, and the amount of movement is the number of frames in which a moving image of the character is displayed.

15. An apparatus according to claim 13, wherein said computation means performs the computation on the basis of the period of times during which the motion is continued.

16. An apparatus according to claim 13, wherein said computation means performs the computation on the basis of the amount of change in the motion.

17. An apparatus according to claim 13, wherein said computation means performs the computation on the basis of a motion mode of the motion.

18. An apparatus according to claim 17, wherein the motion mode relates to a kind of expression of the character.

19. An apparatus according to claim 17, wherein the motion mode relates to a kind of method for a conversation held by the character.

20. An apparatus according to claim 17, wherein the motion mode relates to a kind of personality of the character.

21. An information processing apparatus for providing a character to a user-side apparatus, said information processing apparatus comprising:

receiving means for receiving information designating a motion of the character;

computation means for computing a charge for the character on the basis of the motion of the character; and measuring means for measuring the motion of the character, wherein said computation means performs the computation on the basis of the measured motion of the character.

22. An apparatus according to claim 13, wherein the character is generated and moved by processing character data formed from a plurality of images by executing a character display/control program.

23. An information processing apparatus provided with characters form a character providing apparatus, said information processing apparatus comprising:

designation means for designating a motion of the character; and display means for displaying the character moving on the basis of the designation by said designation means, wherein said designation means designates the number of parts moved in the motion.

24. An information processing apparatus provided with characters form a character providing apparatus, said information processing apparatus comprising:

designation means for designating a motion of the character; and display means for displaying the character moving on the basis of the designation by said designation means, wherein said designation means designates an amount of movement of the motion, and the amount of movement is the number of frames in which a moving image of the character is displayed.

25. An apparatus according to claim 23, wherein said designation means designates a period of time during which the motion is to be continued.

26. An apparatus according to claim 23, wherein said designation means designates an amount of change in the motion.

27. An apparatus according to claim 23, wherein said designation means designates a motion mode of the motion.

28. An apparatus according to claim 27, wherein the motion mode relates to a kind of expression of the character.

29. An apparatus according to claim 27, wherein the motion mode relates to a kind of method for a conversation held by the character.

30. An apparatus according to claim 27, wherein the motion mode relates to a kind of personality of the character.

31. An apparatus according to claim 23, wherein the character is encrypted and said apparatus has information for decrypting the character.

32. An apparatus according to claim 23, wherein access to the character is restricted and said apparatus has authentication information for enabling access to the character.

33. An apparatus according to claim 23, wherein the character is generated and moved by processing character data formed from a plurality of images by executing a character display/control program.

34. A method of controlling an information processing apparatus for providing a character to a user-side apparatus, said method comprising the steps of:

receiving information designating a motion of the character; and computing a charge for the character on the basis of the motion of the character, wherein, in said computing step, the computing is performed on the basis of the number of parts moved in the motion.

35. A recording medium on which a program for controlling an information processing apparatus for providing a character to a user-side apparatus is stored, said program comprising the steps of:

receiving information designating a motion of the character; and computing a charge for the character on the basis of the motion of the character, wherein, in said computing step, the computation is performed on the basis of the number of parts moved in the motion.

* * * * *

UNITED STATES PATENT AND TRADEMARK OFFICE
CERTIFICATE OF CORRECTION

PATENT NO. : 6,956,575, B2
DATED : October 18, 2005
INVENTOR(S) : Hiroaki Nakazawa et al.

It is certified that error appears in the above-identified patent and that said Letters Patent is hereby corrected as shown below:

<u>Title page,</u>
Item [57], ABSTRACT,
Line 7, "according" should read -- according to --.

<u>Column 7,</u>
Line 25, "though" should read -- through --.

<u>Column 14,</u>
Line 37, "area" should read -- area, --.

<u>Column 15,</u>
Line 24, "according" should read -- according to --.

<u>Column 17,</u>
Lines 15 and 25, "form" should read -- from --.

<u>Column 18,</u>
Line 26, "computing" should read -- computation --.

Signed and Sealed this

Twenty-third Day of May, 2006

JON W. DUDAS
*Director of the United States Patent and Trademark Office*